(12) United States Patent
Barnes

(10) Patent No.: US 10,650,136 B2
(45) Date of Patent: May 12, 2020

(54) APPARATUS AND METHOD FOR CONTROLLING USE OF BOUNDED POINTERS

(71) Applicant: ARM LIMITED, Cambridge (GB)

(72) Inventor: Graeme Peter Barnes, Cambridge (GB)

(73) Assignee: ARM Limited, Cambridge (GB)

( * ) Notice: Subject to any disclaimer, the term of this patent is extended or adjusted under 35 U.S.C. 154(b) by 77 days.

(21) Appl. No.: 15/770,560

(22) PCT Filed: Sep. 30, 2016

(86) PCT No.: PCT/GB2016/053044
§ 371 (c)(1),
(2) Date: Apr. 24, 2018

(87) PCT Pub. No.: WO2017/081438
PCT Pub. Date: May 18, 2017

(65) Prior Publication Data
US 2019/0012455 A1 Jan. 10, 2019

(30) Foreign Application Priority Data
Nov. 12, 2015 (GB) .................................. 1519996.1

(51) Int. Cl.
*G06F 21/00* (2013.01)
*G06F 21/52* (2013.01)

(52) U.S. Cl.
CPC ........ *G06F 21/52* (2013.01); *G06F 2221/033* (2013.01)

(58) Field of Classification Search
CPC .... G06F 21/52; G06F 2221/033; G06F 21/54; G06F 9/3005
See application file for complete search history.

(56) References Cited

U.S. PATENT DOCUMENTS 5,313,611 A * 5/1994 Franklin ................. G06F 7/544
711/206
5,583,988 A * 12/1996 Crank ................. G06F 11/3612
714/38.1

(Continued)

OTHER PUBLICATIONS

Crane et al., "It's a TRaP: Table Randomization and Protection against Function-Reuse Attacks", Proceedings of the 22nd ACM SIGSAC Conference on Computer and Communications Security, Denver, Colorado, USA—Oct. 12-16, (Year: 2015).*

(Continued)

*Primary Examiner* — Morshed Mehedi
(74) *Attorney, Agent, or Firm* — Nixon & Vanderhye, P.C.

(57) ABSTRACT

An apparatus and method are provided for controlling use of bounded pointers. The apparatus has a plurality of bounded pointer storage elements, each bounded pointer storage element being used to store a bounded pointer and associated permission attributes indicative of allowed uses of the bounded pointer. In accordance with the present technique, the associated permission attributes include a copy permission attribute indicating whether the bounded pointer is allowed to be subjected to a copy operation. Processing circuitry is then responsive to at least one instruction that specifies the copy operation, to generate, from a source bounded pointer and associated permission attributes of a source bounded pointer storage element, a destination bounded pointer and associated permission attributes to be stored in a destination bounded pointer storage element. Furthermore, the processing circuitry marks the source bounded pointer storage element as storing an invalid bounded pointer dependent on whether the copy permission attribute of the source bounded pointer indicates that the source bounded pointer is to be prevented from being subjected to the copy operation. This provides an effective mechanism for inhibiting the subversion of control flow integrity when executing software on the apparatus.

20 Claims, 10 Drawing Sheets

(56) References Cited

U.S. PATENT DOCUMENTS

| | | | | |
|---|---|---|---|---|
| 5,590,329 | A * | 12/1996 | Goodnow, II | G06F 11/3624 714/E11.211 |
| 7,856,624 | B2 * | 12/2010 | Plum | G06F 11/3624 717/106 |
| 9,189,375 | B1 * | 11/2015 | Bastien | G06F 11/3688 |
| 2004/0193814 | A1 * | 9/2004 | Erickson | G06F 12/1458 711/156 |
| 2010/0180084 | A1 * | 7/2010 | Cypher | G06F 12/0817 711/135 |
| 2011/0078389 | A1 * | 3/2011 | Patel | G06F 9/32 711/154 |
| 2011/0161615 | A1 * | 6/2011 | Odaira | G06F 12/0269 711/166 |
| 2013/0103644 | A1 * | 4/2013 | Shoens | G06F 16/1873 707/638 |

OTHER PUBLICATIONS

Meyer, "A novel processor architecture with exact tag-free pointers", IEEE Micro ( vol. 24 , Issue: 3 , May-Jun. 2004.*

International Search Report for PCT/GB2016/053044 dated Jan. 3, 2017, 13 pages.

Search Report for GB1519996.1 dated Apr. 25, 2016, 4 pages.

González, "Taxi: Defeating Code Reuse Attacks with Tagged Memory", [online], URL: https://people.csail.mit.edu/hes/ROP/Publications/Julian-thesis.pdf, retrieved on Dec. 19, 2016, 111 pages.

Watson et al., "Capability Hardware Enhanced RISC instructions: CHERI Instruction-Set Architecture", Technical Report, No. 876, University of Cambridge, Sep. 30, 2015, 198 pages.

Carter et al., "Hardware Support for Fast Capability-based Addressing", 6th International Conference on Architectural Support for Programming Languages and Operating Systems (ASPLOS VI), Oct. 5-7, 1994, pp. 1-9.

Watson et al., "CHERI: A Hybrid Capability-System Architecture for Scalable Software Compartmentalization", 2015 IEEE Symposium on Security and Privacy, May 18-20, 2015, 18 pages.

* cited by examiner

| PERMISSION (135) | MEANING WHEN SET (140) |
|---|---|
| EXECUTE | CAN USE POINTER TO FETCH INSTRUCTIONS |
| LOAD | CAN USE POINTER TO LOAD DATA |
| STORE | CAN USE POINTER TO STORE DATA |
| LOAD CAPABILITY | CAN USE POINTER TO LOAD A CAPABILITY |
| STORE CAPABILITY | CAN USE POINTER TO STORE A CAPABILITY |
| ⋮ | ⋮ |
| GLOBAL | CAPABILITY HAS GLOBAL SCOPE |
| STORE LOCAL | CAN STORE NON-GLOBAL CAPABILITIES |
| COPYABLE * | CAPABILITY CAN BE COPIED (COPYING INCLUDING MUTATING WITHOUT EXTENDING PERMISSIONS) * |

(130)

NEW PERMISSION *

FIG. 4

APPARATUS AND METHOD FOR CONTROLLING USE OF BOUNDED POINTERS

This application is the U.S. national phase of International Application No. PCT/GB2016/053044 filed Sep. 30, 2016 which designated the U.S. and claims priority to GB Patent Application No. 1519996.1 filed Nov. 12, 2015, the entire contents of each of which are hereby incorporated by reference.

The present technique relates to the field of data processing.

Some data processing apparatuses may support bounded pointers where a pointer indicating a particular address is associated with range information indicating an allowable range of addresses for the pointer. For example, such pointers may be referred to as "fat pointers".

One issue facing software is control flow integrity (CFI). In particular, attempts may be made to subvert the intended flow of control through a computer program, for example by seeking to abuse the ability to branch to an address derived from data held in a register. The earlier-mentioned bounded pointers may be used when determining such an address. Accordingly, it would be desirable to provide bounded pointers with a mechanism that improves resilience to such an abuse.

In one example configuration, there is provided an apparatus, comprising: a plurality of bounded pointer storage elements, each bounded pointer storage element to store a bounded pointer and associated permission attributes indicative of allowed uses of the bounded pointer, said associated permission attributes comprising a copy permission attribute indicating whether the bounded pointer is allowed to be subjected to a copy operation; and processing circuitry, responsive to at least one instruction that specifies the copy operation, to generate, from a source bounded pointer and associated permission attributes of a source bounded pointer storage element, a destination bounded pointer and associated permission attributes to be stored in a destination bounded pointer storage element, and to mark the source bounded pointer storage element as storing an invalid bounded pointer dependent on whether the copy permission attribute of the source bounded pointer indicates that the source bounded pointer is to be prevented from being subjected to the copy operation.

In another example configuration, there is provided a method of controlling use of bounded pointers within an apparatus having a plurality of bounded pointer storage elements, each bounded pointer storage element storing a bounded pointer and associated permission attributes indicative of allowed uses of the bounded pointer, the method comprising: providing a copy permission attribute within said associated permission attributes, the copy permission attribute indicating whether the bounded pointer is allowed to be subjected to a copy operation; and responsive to at least one instruction that specifies the copy operation, generating, from a source bounded pointer and associated permission attributes of a source bounded pointer storage element, a destination bounded pointer and associated permission attributes to be stored in a destination bounded pointer storage element, and marking the source bounded pointer storage element as storing an invalid bounded pointer dependent on whether the copy permission attribute of the source bounded pointer indicates that the source bounded pointer is to be prevented from being subjected to the copy operation.

In a yet further example configuration, there is provided an apparatus, comprising: a plurality of bounded pointer storage element means, each bounded pointer storage element means for storing a bounded pointer and associated permission attributes indicative of allowed uses of the bounded pointer, said associated permission attributes comprising a copy permission attribute indicating whether the bounded pointer is allowed to be subjected to a copy operation; and processing means for generating from a source bounded pointer and associated permission attributes of a source bounded pointer storage element means, in response to at least one instruction that specifies the copy operation, a destination bounded pointer and associated permission attributes to be stored in a destination bounded pointer storage element means, and for marking the source bounded pointer storage element means as storing an invalid bounded pointer dependent on whether the copy permission attribute of the source bounded pointer indicates that the source bounded pointer is to be prevented from being subjected to the copy operation.

The present technique will be described further, by way of example only, with reference to embodiments thereof as illustrated in the accompanying drawings, in which:

FIG. 4 is a table illustrating certain permission attributes that may be provided in association with bounded pointers, including a copyable attribute provided in accordance with one embodiment;

Figure 1:
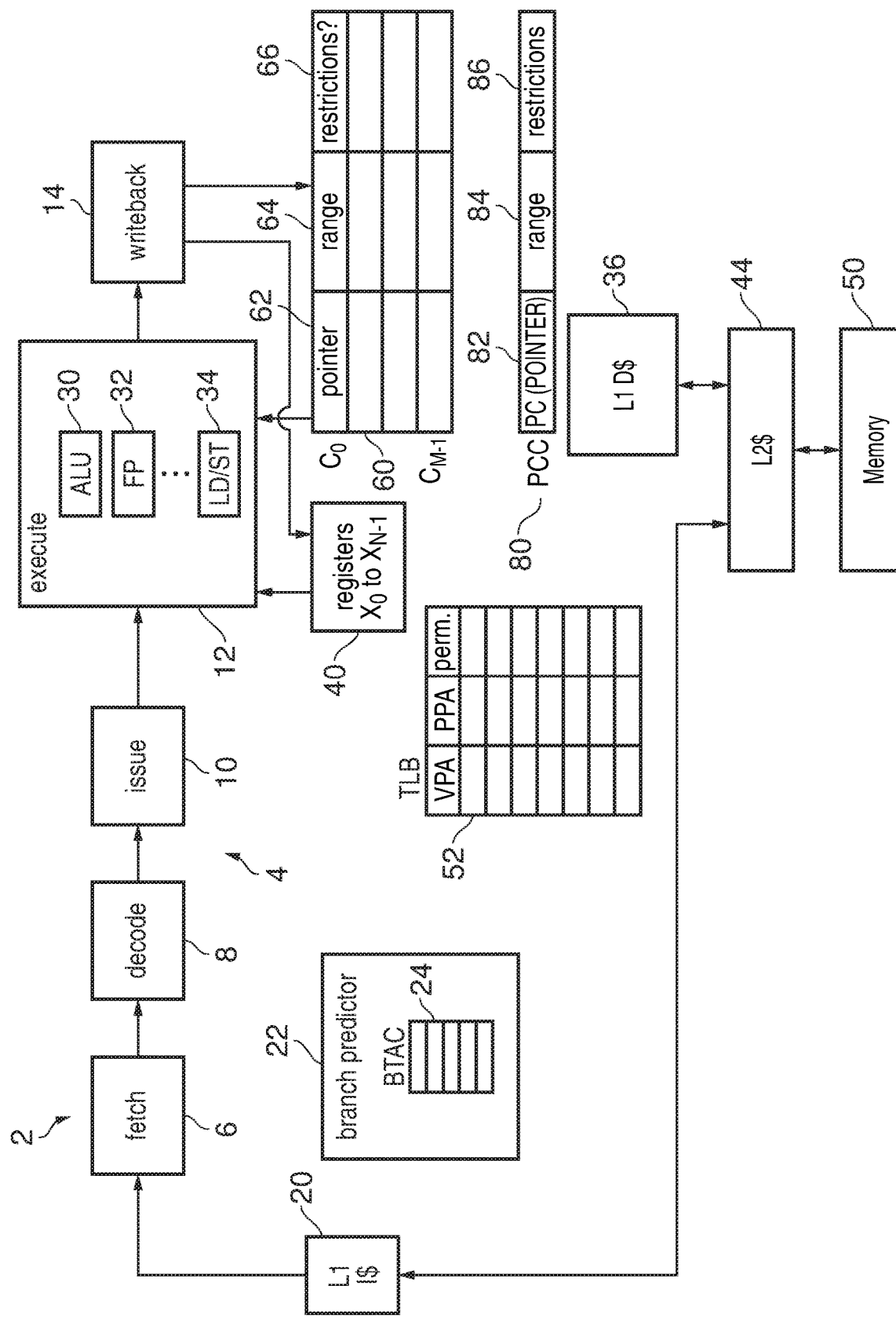
FIG. 1 is a block diagram of an apparatus in accordance with one embodiment.

Before discussing the embodiments with reference to the accompanying figures, the following description of embodiments is provided.

Some processing apparatuses may support the use of bounded pointers. The pointer itself may point to, or be used to determine, the address of a data value to be accessed or an instruction to be executed, for example. However the pointer may also have associated range information which indicates an allowable range of addresses when using the pointer. This can be useful for example for ensuring that the address determined from the pointer remains within certain bounds to maintain security or functional correctness of behaviour. For example, there is increasing interest in capability-based architectures in which certain capabilities are defined for a given process, and an error can be triggered if there is an attempt to carry out operations outside the defined capabilities. The range information for a bounded pointer may be part of the capability information defined for such an architecture, and within a capability-based architecture such a bounded pointer (including its associated capability information) may be referred to as a capability. Alternatively, there may be some non-capability based architectures which allow bounded pointers to be defined.

Hence, an apparatus may have bounded pointer storage elements used to store a pointer having associated range information indicative of an allowable range of addresses when using the pointer. Each bounded pointer storage element could be a register, or a memory location in general purpose memory, for example a location on a stack memory.

Certain instructions can be used to reference such a bounded pointer storage element in order to obtain a pointer which is then used to derive an address in memory required during operation of the instruction. The pointer may be used directly to identify the memory address, or may be used to derive the memory address, for example by the addition of an offset to the pointer value.

When considering the earlier-mentioned CFI issue, certain properties of bounded pointers such as those used in the above-mentioned capability-based architectures can mitigate to a degree the CFI problem. For example, the associated range information can limit the range of addresses that may be targeted by a branch instruction when deriving the target address from the pointer stored in a bounded pointer storage element. In capability-based architectures, it is also known to provide mechanisms that prevent generic data being used as a capability to derive branch target addresses, and further the locations in which certain capabilities can be maintained may be restricted. However, within these limitations, it is still possible for a rogue process to manipulate bounded pointers in a manner that can give rise to the intended flow of control through a computer program being subverted, for example by enabling control to be transferred to an unexpected program address.

The techniques described herein hence aim to further improve resilience to such potential abuses so as to improve CFI.

The inventors realised that one approach that can be taken to seek to subvert CFI is to make a copy of a bounded pointer, in a manner that would allow that bounded pointer to be reused later. This can for example cause CFI issues where the bounded pointer is able to be used to compute target addresses such as a return address.

A bounded pointer may be provided with associated permission attributes, to indicate allowed uses of the bounded pointer. For example, the permission attributes may identify for which type of operations the bounded pointer is allowed to be referenced, and hence for example whether the pointer can be used to identify data to load or store, to identify instructions to be fetched, etc. In accordance with the technique described herein, such permission attributes are supplemented by the addition of a copy permission attribute whose value can be used to indicate whether the associated bounded pointer is allowed to be subjected to a copy operation. Then, when processing circuitry is handling such a copy operation, the copy permission attribute can be referenced, and steps taken to prevent a copy of the bounded pointer being created dependent on the value of the copy permission attribute.

More particularly, in one embodiment processing circuitry is responsive to at least one instruction that specifies the copy operation, to generate, from a source bounded pointer and associated permission attributes of a source bounded pointer storage element, a destination bounded pointer and associated permission attributes to be stored in a destination bounded pointer storage element. If the contents of the source bounded pointer storage element remain accessible as a result of that process, it will be appreciated that a copy has now been created of the original source bounded pointer. However, in accordance with one embodiment, the processing circuitry is further arranged to mark the source bounded pointer storage element as storing an invalid bounded pointer dependent on whether the copy permission attribute of the source bounded pointer indicates that the source bounded pointer is to be prevented from being subjected to the copy operation.

As a result, it will be appreciated that the default behaviour of the copy operation can be modified dependent on the value of the copy permission attribute, so as to in effect selectively convert the copy process into a move process where the source bounded pointer is invalidated as part of the process.

By providing a copy permission attribute in association with certain bounded pointers, it is possible to limit the above functionality to specific desired bounded pointers. Accordingly, in one embodiment the above-mentioned limitations placed on copying can be restricted to certain bounded pointers, for example those that are considered to be the potential subject of abuse in order to seek to subvert CFI, such as those bounded pointers used to generate target addresses. It has been found that such an approach can significantly reduce the ability of a rogue process to subvert CFI.

There are a number of ways in which the source bounded pointer storage element may be marked as being invalid. In one embodiment, each bounded pointer storage element has a validity field associated therewith to indicate whether the bounded pointer storage element stores a valid bounded pointer, and the processing circuitry is arranged to mark the source bounded pointer storage element as storing an invalid bounded pointer by updating the validity field associated with the source bounded pointer storage element to identify that the source bounded pointer is invalid.

In one embodiment, an existing field can be used to implement the functionality of the validity field. In particular, it is known for example in certain capability-based architectures to provide a tag field in association with each bounded pointer storage element to identify the data type of the contents stored therein. The data type can hence to be used to identify whether that storage element does in fact store a bounded pointer (i.e. a capability), or whether instead it stores some other type of content, for example general data that cannot be used as a capability. Hence, when using such a tag field as the validity field, the tag field may be set to a first value to identify that the content of the bounded pointer storage element forms a bounded pointer and associated permission attributes, and the tag value can be set to a value other than that first value in order to identify that the contents should be treated as data other than a bounded pointer and associated permission attributes.

Hence, when the source bounded pointer storage element is used for the earlier-mentioned copy operation in a situation where the copy permission attribute indicates that the source bounded pointer should be prevented from being subjected to the copy operation, the source bounded pointer storage element can be marked as invalid by effectively setting the tag value to a value that indicates that the content is not a bounded pointer and associated permission attributes. This prevents the content of that source bounded pointer storage element being used thereafter as a bounded pointer (i.e. a capability), and hence ensures that only a single copy of the bounded pointer is retained (i.e. that in the destination bounded pointer storage element).

There are a number of ways in which the value of the copy permission attribute can be taken into account in order to decide whether to invalidate the source bounded pointer storage element during performance of a copy operation. In one embodiment, the source bounded pointer storage element will always be marked as storing an invalid bounded pointer during performance of a copy operation, in situations where the copy permission attribute of the source bounded pointer indicates that the source bounded pointer is to be prevented from being subjected to the copy operation.

In many implementations, memory may be partitioned so as to form global memory that can be shared between multiple program threads (for example a heap), and local memory that is provided for an individual program thread's use, for example a stack frame within a stack. The permission attributes associated with a bounded pointer can also be used to identify whether the bounded pointer has global effect, or is a local bounded pointer associated with a particular program thread.

In the above example use case, the source bounded pointer storage element may be marked as invalid irrespective of whether it stores a global bounded pointer or a local bounded pointer. When the bounded pointer is a global bounded pointer, it may be necessary to use certain atomicity control procedures to make sure that the source bounded pointer storage element is invalidated as an atomic operation. For example, particular care with regards to atomicity may be required when the source bounded pointer storage element is a memory location and stores a bounded pointer that is marked as global, and hence shared with multiple program threads. It will be appreciated that there are a number of known techniques that can be used to ensure atomic operation, and any such technique can be used in this situation.

However, the need to handle certain invalidation operations atomically does add some complexity to the process. In an alternative embodiment, rather than always marking the source bounded pointer storage element as invalid when it is used in a copy operation in situations where the copy permission attribute indicates that the source bounded pointer is to be prevented from being subjected to the copy operation, that functionality is instead qualified dependent on whether the bounded pointer is shared between multiple threads or not. In particular, in one embodiment, the associated permission attributes comprise a sharing attribute indicating whether the bounded pointer is shared between multiple threads, and the processing circuitry is arranged, when executing said at least one instruction that specifies the copy operation, to mark the source bounded pointer storage element as storing an invalid bounded pointer when the copy permission attribute of the source bounded pointer indicates that the source bounded pointer is to be prevented from being subjected to the copy operation and the sharing attribute indicates that the bounded pointer is not shared between multiple threads. Hence, in this embodiment the invalidation only occurs if the bounded pointer is also indicated as not being shared between multiple threads, i.e. it is a local bounded pointer, also referred to herein as a local capability. By such an approach, any potential atomicity issues are avoided. Further, whilst it may be the case that there are perfectly legitimate reasons to make a copy of certain global bounded pointers, this is often not the case for a local bounded pointer, and accordingly an attempt to make a copy of a local bounded pointer is much more likely to indicate a potential CFI attack. Accordingly, from a practical standpoint, restricting the above described operation to situations where the sharing attribute indicates that the bounded pointer is not shared between multiple threads still provides significant protection against CFI attacks.

The copy operation can take a variety of forms, but in one embodiment causes the destination bounded pointer and associated permission attributes to be a replica of the source bounded pointer and associated permission attributes, i.e. no modification is made during the copy process.

However, in an alternative embodiment the copy operation may cause at least one of the destination bounded pointer and associated permission attributes to be a modified version of the source bounded pointer and associated permission attributes.

In one embodiment, the source bounded pointer may comprise a pointer value and associated range information, and during the copy operation modification of the pointer value itself may be prohibited. However, the copy operation may allow some adjustment to the range information, but in one embodiment, during a copy operation, extension of the bounds of the bounded pointer is prohibited, i.e. the range can only be reduced not extended. Similarly, if during the copy operation modification of the associated permission attributes takes place, the copy operation may prohibit any modification that seeks to increase the allowed uses of the bounded pointer. Hence, it will typically be the case that any such modification made during the copy operation will result in a bounded pointer whose uses are further restricted relative to the uses associated with the source bounded pointer.

As mentioned previously, a selection can be made as to which types of bounded pointer the earlier-mentioned copy permission attribute is used in association with. In one embodiment, the use of the copy permission attribute can be associated with source bounded pointers that are used to determine a function pointer, for example a target address such as the address to which a branch operation branches, or the return address that is returned to following a branch operation.

The bounded pointer storage elements may take the form of registers and/or memory locations. In one embodiment, at least one of the source bounded pointer storage element and the destination bounded pointer storage element is a bounded pointer register. In some cases both the source bounded pointer storage element and the destination bounded pointer storage element may be formed of registers, but in an alternative embodiment at least one of the source bounded pointer storage element and the destination bounded pointer storage element may be a memory location. Indeed, if the architecture allows, it is possible that both of the source bounded pointer storage element and the destination bounded pointer storage element could be a memory location.

Whilst in one embodiment, the instruction that specifies the copy operation, and that causes the processing circuitry to undertake the selective invalidation of the source bounded pointer storage element as discussed earlier, can be a standard pre-existing instruction. For example, in a capability-based architecture, it can be a so-called capability instruction that specifies a capability storage element. However, in an alternative embodiment a "no copy" variant of such an instruction may be generated, and the above described functionality may be limited to situations where that "no copy" variant is executed. For example, in one embodiment the at least one instruction that causes the processing circuitry to selectively invalidate the source bounded pointer storage element in the manner discussed earlier is a first instruction which is a "no copy" variant of a second instruction. In such an embodiment, the processing circuitry may be responsive to execution of the second instruction, in an instance where the copy permission attribute of the source bounded pointer indicates that the source bounded pointer is to be prevented from being subjected to the copy operation, to implement a predetermined action to prevent a copy of the source bounded pointer being created. Hence, the execution of the second instruction can still be arranged to ensure that copying does not occur, but the action taken may be different to the action that is performed when the first instruction (i.e. the no copy variant) is executed.

The predetermined action can take a variety of forms. For example, in one embodiment the predetermined action may involve aborting execution of the second instruction.

In an alternative embodiment, the predetermined action may comprise marking the destination bounded pointer storage element as storing an invalid bounded pointer, using a similar mechanism to that discussed earlier for invalidating the source bounded pointer storage element. It will be appreciated that if the destination bounded pointer storage element is marked as invalid, this essentially results in the copy operation being deemed not to have occurred. Hence, this is still an effective mechanism for ensuring that a copy is not generated.

The type of instruction that specifies a copy operation, and that causes the processing circuitry to selectively invalidate the source bounded pointer storage element using the mechanisms discussed earlier, can take a variety of forms. For example, it may take the form of a load instruction that is used to load a bounded pointer from memory into a register, or a store instruction that is used to store a bounded pointer from a register back to memory. In another example, it may take the form of a move instruction that moves a bounded pointer from a source register to a destination register. It should be noted that although the instruction is referred to as a move instruction, it is typically the case that the move instruction itself does not remove the data from the source register, and hence effectively a copy is generated in the absence of the above described functionality of the present technique.

In a yet further example, the instruction may comprise a branch instruction, where the source bounded pointer is used to generate a target address for storage as a new program counter value within a program counter bounded pointer storage element. Again, in the absence of the above described present technique, the program counter bounded pointer storage element would be updated, but the original source bounded pointer would still reside within the source bounded pointer storage element, and accordingly a copy will have been created. However, through use of the earlier described techniques, it is possible to ensure that only one copy is retained, namely the one stored in the program counter bounded pointer storage element after execution of the branch instruction.

In one embodiment, the branch instruction is a branch with link instruction, during execution of the branch with link instruction the processing circuitry being arranged to store a current content of the program counter bounded pointer storage element within a link register bounded pointer storage element to identify a return address bounded pointer, and to set the copy permission attribute within the link register bounded pointer storage element to indicate that the return address bounded pointer is to be prevented from being subjected to the copy operation. Hence, irrespective of the value of any copy permission attribute associated with the current content of the program counter bounded pointer storage element (or even if such a copy permission attribute is not used in association with the program counter bounded pointer storage element), it can be ensured that when the link register bounded pointer storage element is populated with the return address bounded pointer, the copy permission attribute is set to indicate that the return address bounded pointer is to be prevented from being subjected to the copy operation. This ensures that a return address cannot be copied, for example by seeking to copy the current contents of the link register to a different register, or to memory.

The bounded pointer storage elements can be constructed in a variety of ways. For example, whilst the bounded pointer and associated permission attributes may be stored as a contiguous block of information within a single physical storage element, in an alternative embodiment the bounded pointer storage element may comprise a first sub-element to store the bounded pointer and a second sub-element to store the associated permission attributes. Further, considering the bounded pointer itself, the bounded pointer and associated range information need not be stored in physically the same location and hence the range information can be stored separately to the pointer value itself.

Particular embodiments will now be described with reference to the Figures.

FIG. 1 schematically illustrates an example of a data processing apparatus 2 comprising a processing pipeline 4 for processing instructions. In this example the processing pipeline 4 includes a number of pipeline stages including a fetch stage 6, a decode stage 8, an issue stage 10, an execute stage 12, and a write back stage 14, but it will be appreciated that other types or combinations of stages may be provided. For example a rename stage for performing register renaming could be included in some embodiments. Instructions to be processed move from stage to stage, and while an instruction is pending at one stage another instruction may be pending at a different stage of the pipeline 4.

The fetch stage 6 fetches instructions from a level 1 (L1) instruction cache 20. The fetch stage 6 may usually fetch instructions sequentially from successive instruction addresses. However, the fetch stage may also have a branch predictor 22 for predicting the outcome of branch instructions, and the fetch stage 6 can fetch instructions from a (non-sequential) branch target address if the branch is predicted taken, or from the next sequential address if the branch is predicted not taken. The branch predictor 22 may include one or more branch history tables for storing information for predicting whether certain branches are likely to be taken or not. For example, the branch history tables may include counters for tracking the actual outcomes of previously executed branches or representing confidence in predictions made for branches. The branch predictor 22 may also include a branch target address cache (BTAC) 24 for caching previous target addresses of branch instructions so that these can be predicted on subsequent encounters of the same branch instructions.

The fetched instructions are passed to the decode stage 8 which decodes the instructions to generate decoded instructions. The decoded instructions may comprise control information for controlling the execute stage 12 to execute the appropriate processing operations. For some more complex instructions fetched from the cache 20, the decode stage 8 may map those instructions to multiple decoded instructions, which may be known as micro-operations (μops or uops). Hence, there may not be a one-to-one relationship between the instructions fetched from the L1 instruction cache 20 and instructions as seen by later stages of the pipeline. In general, references to "instructions" in the present application should be interpreted as including micro-operations.

The decoded instructions are passed to the issue stage 10, which determines whether operands required for execution of the instructions are available and issues the instructions for execution when the operands are available. Some embodiments may support in-order processing so that instructions are issued for execution in an order corresponding to the program order in which instructions were fetched from the L1 instruction cache 20. Other embodiments may support out-of-order execution, so that instructions can be issued to the execute stage 12 in a different order from the program order. Out-of-order processing can be useful for improving performance because while an earlier instruction is stalled while awaiting operands, a later instruction in the program order whose operands are available can be executed first.

The issue stage 10 issues the instructions to the execute stage 12 where the instructions are executed to carry out various data processing operations. For example the execute stage may include a number of execute units 30, 32, 34 including an arithmetic/logic unit (ALU) 30 for carrying out arithmetic or logical operations on integer values, a floating-point (FP) unit 32 for carrying out operations on values represented in floating-point form, and a load/store unit 34 for carrying out load operations for loading a data value from a level 1 (L1) data cache 36 to a register 40 or store operations for storing a data value from a register 40 to the L1 data cache 36. It will be appreciated that these are just some examples of the types of execute units which could be provided, and many other kinds could also be provided. For carrying out the processing operations, the execute stage 12 may read data values from a set of registers 40. Results of the executed instructions may then be written back to the registers 40 by the write back stage 14.

The L1 instruction cache 20 and L1 data cache 36 may be part of a cache hierarchy including multiple levels of caches. For example a level two (L2) cache 44 may also be provided and optionally further levels of cache could be provided. In this example the L2 cache 44 is shared between the L1 instruction cache 20 and L1 data cache 36 but other examples may have separate L2 instruction and data caches. When an instruction to be fetched is not in the L1 instruction cache 20 then it can be fetched from the L2 cache 44 and similarly if the instruction is not in the L2 cache 44 then it can be fetched from main memory 50. Similarly, in response to load instructions, data can be fetched from the L2 cache 44 if it is not in the L1 data cache 36 and fetched from memory 50 if required. Any known scheme may be used for managing the cache hierarchy.

The addresses used by the pipeline 4 to refer to program instructions and data values may be virtual addresses, but at least the main memory 50, and optionally also at least some levels of the cache hierarchy, may be physically addressed. Hence, a translation lookaside buffer 52 (TLB) may be provided for translating the virtual addresses used by the pipeline 4 into physical addresses used for accessing the cache or memory. For example, the TLB 52 may include a number of entries each specifying a virtual page address of a corresponding page of the virtual address space and a corresponding physical page address to which the virtual page address should be mapped in order to translate the virtual addresses within the corresponding page to physical addresses. For example the virtual and physical page addresses may correspond to a most significant portion of the corresponding virtual and physical addresses, with the remaining least significant portion staying unchanged when mapping a virtual address to a physical address. As well as the address translation information, each TLB entry may also include some information specifying access permissions such as indicating whether certain pages of addresses are accessible in certain modes of the pipeline 4. In some embodiments, the TLB entries could also define other properties of the corresponding page of addresses, such as cache policy information defining which levels of the cache hierarchy are updated in response to read or write operations (e.g. whether the cache should operate in a write back or write through mode), or information defining whether data accesses to addresses in the corresponding page can be reordered by the memory system compared to the order in which the data accesses were issued by the pipeline 4.

While FIG. 1 shows a single level TLB 52, it will be appreciated that a hierarchy of TLBs may be provided so that a level one (L1) TLB 52 may include TLB entries for translating addresses in a number of recently accessed pages and a level two (L2) TLB may be provided for storing entries for a larger number of pages. When a required entry is not present in the L1 TLB then it can be fetched from the L2 TLB, or from further TLBs in the hierarchy. If a required entry for a page to be accessed is not in any of the TLBs then a page table walk can be performed to access page tables in the memory 50. Any known TLB management scheme can be used in the present technique.

Also, it will be appreciated that some systems may support multiple levels of address translation so that, for example, a first TLB (or hierarchy of TLBs) may be used to translate virtual addresses into intermediate addresses, and a second level of address translation using one or more further TLB(s) may then translate the intermediate addresses into physical addresses used to access a cache or memory. This can be useful for supporting virtualisation where the first level of address translation may be managed by the operating system and the second level of address translation may be managed by the hypervisor, for example.

As shown in FIG. 1, the apparatus 2 may have a set of bounded pointer registers 60. Whilst the set of bounded pointer registers is shown in FIG. 1 as being physically separate to the set of general purpose data registers 40, in one embodiment the same physical storage may be used to provide both the general purpose data registers and the bounded pointer registers.

Each bounded pointer register 60 includes a pointer value 62 that may be used to determine an address of a data value to be accessed, and range information 64 specifying an allowable range of addresses when using the corresponding pointer 62. The bounded pointer register 60 may also include restrictions information 66 (also referred to herein as permissions information) which may define one or more restrictions/permissions on the use of the pointer. For example the restriction 66 could be used to restrict the types of instructions which may use the pointer 62, or the modes of the pipeline 4 in which the pointer can be used. Hence, the range information 64 and restriction information 66 may be considered to define capabilities within which the pointer 62 is allowed to be used. When an attempt is made to use a pointer 62 outside the defined capabilities, an error can be triggered. The range information 64 can be useful for example for ensuring that pointers remain within certain known bounds and do not stray to other areas of the memory address space which might contain sensitive or secure information. In an embodiment where the same physical storage is used for both general purpose data registers and bounded pointer registers, then in one embodiment the pointer value 62 may for example be stored within the same storage location as used for a corresponding general purpose register.

Figure 2:
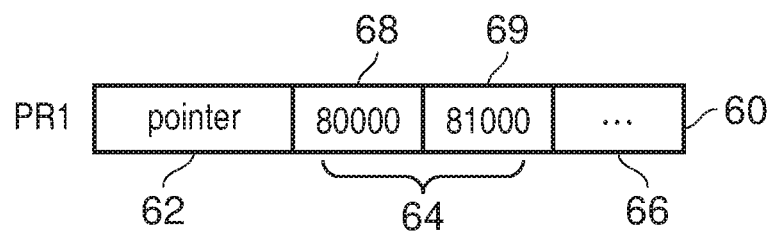
FIG. 2 shows examples of types of instruction for which an error may be triggered if there is an attempt to set or access a pointer value within the set of bounded pointer storage elements, where that pointer value is used to specify an address outside the range indicated by the associated range information.

FIG. 2 shows an example of types of instructions for which the allowable range is used to protect against unauthorised access to data or instructions. As shown in the top part of FIG. 2, a particular bounded pointer register PR1 includes a given pointer value 62 and range information 64, which in this example is specified using a lower bound address 68 defining the lower bound of the allowable range and an upper bound address 69 defining the upper bound of the allowable range. For example, the bounds 68, 69 are set to define a range of addresses 80000 to 81000. Errors may be triggered when certain instructions reference the bounded pointer register PR1 and the address determined from the pointer 62 is outside this range.

For example, as shown in part A of FIG. 2, in some systems an error may be triggered if there is an attempt to set the value of the pointer 62 in the pointer register 60 to a value lying outside the range specified by the range information 64 (here it being assumed that the pointer directly specifies an address). This avoids the pointer 62 taking any value outside the specified range so that any accesses using the pointer can be ensured to lie safely within the allowed range. Alternatively, as shown in part B of FIG. 2, an error can be triggered when an instruction attempts to access a location identified by the address of the pointer 62 when that address lies outside the specified range. Hence, it may still be allowable to set the pointer 62 to a value outside the specified range, but once a data access at the pointer address (or an address derived from the pointer) is attempted then an error may be triggered if the address lies outside the allowed range. Other systems may trigger errors in response to both the types of instruction shown in parts A and B of FIG. 2.

The range information 64 could be set in different ways. For example secure code, or an operating system or hypervisor, may specify the range allowed for a given pointer. For example, the instruction set architecture may include a number of instructions for setting or modifying the range information 64 for a given pointer 62, and execution of these instructions could be restricted to certain software or certain modes or exception states of the processor 4. Any known technique for setting or modifying the range information 64 could be used.

In addition to the set of bounded pointer storage elements 60 that may be used at the execute state 12 when executing certain instructions that make reference to a pointer, a program counter capability (PCC) register 80 may also be used to provide similar functionality at the fetch stage 6 when instructions are being fetched from the level one instruction cache 20. In particular, a program counter pointer may be stored in a field 82, with the PCC 80 also providing range information 84 and any appropriate restriction information 86, similar to the range and restriction information provided with each of the pointers in the set of bounded pointer storage elements 60.

Figure 3:
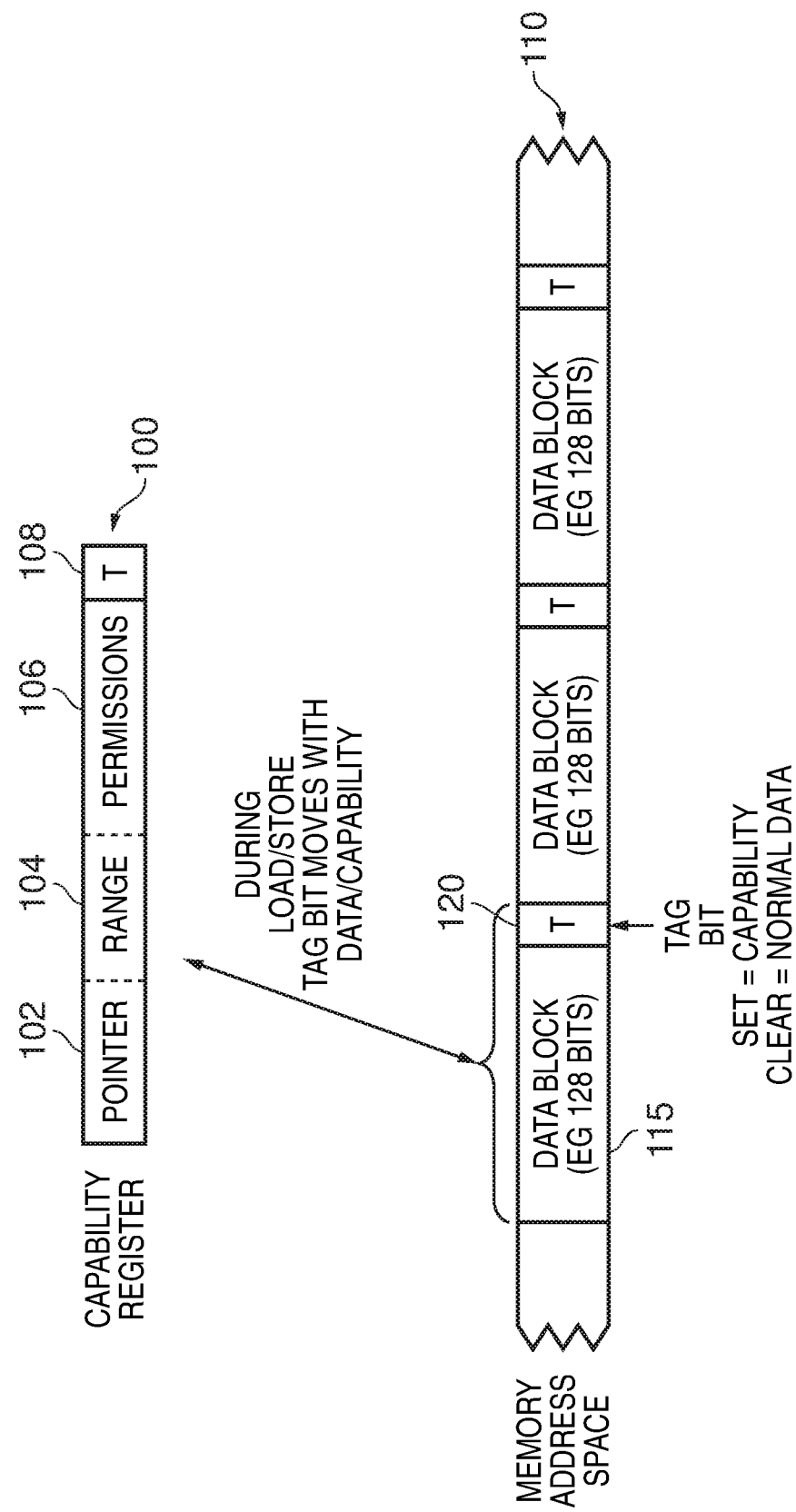
FIG. 3 illustrates the use of a tag bit in association with bounded pointers, in accordance with one embodiment.

FIG. 3 schematically illustrates how a tag bit is used in association with individual data blocks to identify whether those data blocks represent a capability (i.e. a bounded pointer and associated restrictions information), or represent normal data. In particular, the memory address space 110 will store a series of data blocks 115, which typically will have a specified size. Purely for the sake of illustration, it is assumed in this example that each data block comprises 128 bits. In association with each data block 115, there is provided a tag field 120, which in one example is a single bit field referred to as the tag bit, which is set to identify that the associated data block represents a capability, and is cleared to indicate that the associated data block represents normal data, and hence cannot be treated as a capability. It will be appreciated that the actual value associated with the set or the clear state can vary dependent on embodiment, but purely by way of illustration, in one embodiment if the tag bit has a value of 1, it indicates that the associated data block is a capability, and if it has a value of 0 it indicates that the associated data block contains normal data.

When a capability is loaded into one of the bounded pointer registers 60 (also referred to herein as a capability register), such as the capability register 100 shown in FIG. 3, then the tag bit moves with the capability information. Accordingly, when a capability is loaded into the capability register 100, the pointer 102, range information 104 and restrictions information 106 (hereafter referred to as the permissions information) will be loaded into the capability register. In addition, in association with that capability register, or as a specific bit field within it, the tag bit 108 will be set to identify that the contents represent a capability. Similarly, when a capability is stored back out to memory, the relevant tag bit 120 will be set in association with the data block in which the capability is stored. By such an approach, it is possible to distinguish between a capability and normal data, and hence ensure that normal data cannot be used as a capability.

FIG. 4 is a table 130 illustrating various permissions that can be specified within the permissions field 106 of a capability. The column 135 sets out the various permissions, with the column 140 then identifying the meaning of each permission. From FIG. 4, it can be seen that various permissions can be set to identify whether the pointer specified in the capability can be used to identify an address from which to load, or to which to store, general purpose data, or capabilities. An execute permission can also be used to identify whether the pointer specified in the capability can be used to identify an address from which to fetch an instruction. In addition, a global permission can be used to indicate whether the capability has global scope, or whether instead it is treated as a local capability associated solely with the program thread to which that capability is assigned. In addition, in one embodiment a "store local" permission is provided to identify whether the pointer value specified in the capability can be used to identify a store address for a non-global capability. If it is set, then both global and local capabilities can be stored using the pointer, whereas if it is cleared only global capabilities can be stored using the pointer.

Further, for the embodiments described hereafter, an additional permission, called the "copyable" permission herein, is provided to identify whether the capability can be subjected to a copy operation. The copy operation can take a variety of forms, and in one embodiment includes not only operations that create an absolute replica of the capability, but also operations that cause a mutated version of the capability to be created. In one embodiment, copying of capabilities will be restricted so that neither the range nor the permissions can be extended as a result of the copy process. Further, if the copyable field is set, this indicates that the capability can be copied, whereas if it is not set this indicates that the capability cannot be copied.

The "copyable" permission is an example of a "copy permission attribute" referred to herein. It will be appreciated that the permission can be expressed in a different way provided it enables a distinction to be made between capabilities that are allowed to be copied and capabilities that are not. For example, a "non-copyable" permission may instead be provided as an example of a copy permission attribute, which when set will indicate that the capability cannot be copied, and when clear will indicate that the capability can be copied.

As mentioned earlier, once a program thread has been allocated a capability, then to the extent it is allowed to modify the capability, and in particular the permissions specified in the capability, in one embodiment it is restricted to only be allowed to reduce the permissions, for example by clearing the relevant permission bit, but will not be allowed to extend the permissions. Hence, if a program thread has been allocated a capability that has the load permission set for data, but the execute permission not set for instructions, it may be possible for the thread to clear the load permission, but the thread will not be able to set the execute permission.

Figure 5:
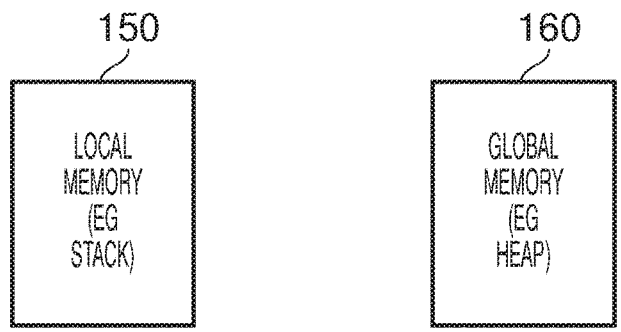
FIG. 5 illustrates how memory may be partitioned into local memory and global memory.

The memory address space available to the apparatus can be considered to be partitioned into local memory 150 and global memory 160, as shown schematically in FIG. 5. The local memory 150 may include one or more stacks, in which stack frames can be allocated to individual program threads to allow those program threads to store local data (i.e. data specific to that thread). The global memory 160 may for example include a heap, and provides an area in which data shared between multiple program threads can be stored.

Figure 6:
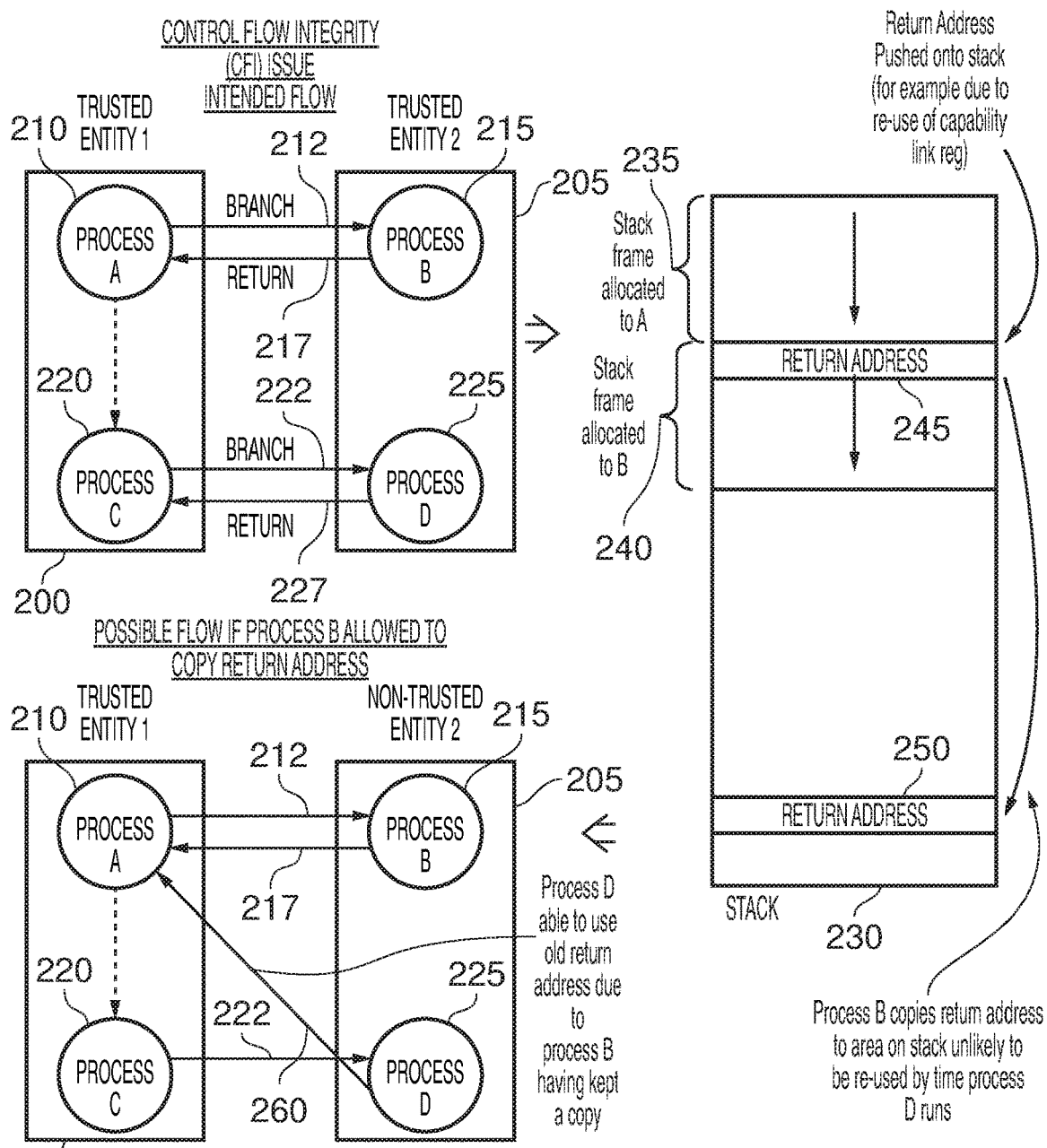
FIG. 6 illustrates a control flow integrity issue that may arise if a non-trusted process has the ability to make a copy of a bounded pointer.

FIG. 6 is a flow diagram illustrating how a Control Flow Integrity (CFI) issue can arise when a non-trusted entity copies a capability in a way that allows that copy to be retained for use by a later process of the non-trusted entity. In particular, it is assumed that a trusted entity 1 200 executes process A 210 during which a branch instruction is executed that causes the instruction flow to branch to a target address within process B 215 of a non-trusted entity 2 205, as indicated by the branch path 212. It is assumed that the branch instruction executed by process A 210 is a branch with link instruction, and accordingly at the time of the branch being performed, a return address is generated from the current program counter value, with that return address being stored within a capability link register available to process B 215. In due course once process B has completed, the return address will be accessed from the capability link register, and processing will then return over path 217 to process A 210.

The above outlines the normal, anticipated behaviour, whereafter processing within the trusted entity 200 continues, and as shown in FIG. 6 in association with the "intended flow" portion, process C 220 will subsequently be executed, and a similar branch and return activity over path 222, 227 will occur in order to invoke process D 225 on the non-trusted entity 205.

Since the processes operating on the non-trusted entity 205 are only intended to use the return address to return processing back to the trusted entity, there is no expected need for a process executed on the non-trusted entity to have to copy the return address during its normal processing. However, if for example process B 215 did incorporate a step of storing the capability link register's contents out to a memory elocation it is possible that copy could be retained in a manner that allowed it to be accessed by process D. This is illustrated schematically in the remainder of FIG. 6 by way of a specific example.

In particular, it is assumed that the local memory 150 includes a stack 230, and that during execution of process A 210 and process B 215, both process A and process B are allocated associated stack frames 235, 240 on the stack 230. Typically stack frames are allocated from the top of the stack, and when individual processes complete, the data on the stack is invalidated freeing up space on the stack to be allocated to a subsequent process.

It is assumed in this example that at some point process B 215 stores the contents of its capability link register out to its stack frame 240, resulting in the return address 245 being placed on the stack frame. This initial storing of the return address onto the stack frame could be directly the result of some subversive activity of process B, or in fact could be done legitimately, for example due to the chaining of exceptions causing the contents of the capability link register to need to be temporarily stored onto the stack frame 240.

If the return address information merely stays within the confines of the stack frame, then it will ultimately be popped off the stack in due course, for example when the information needs to be loaded back into the capability link register. Further, if it still resides on the stack frame at the time process B completes, then that data would typically be invalidated when the stack frame is deallocated.

However, if process B copies the return address information 245 to the location 250 towards the bottom of the stack 230, then it is possible that return address information will persist for a significant period of time. For example, it is often the case that the entirety of the stack 230 is not used, and accordingly the addresses towards the bottom of the stack do not get invalidated and overwritten regularly.

This can give rise to the possible subverting of the intended program flow, as shown in the lower-left hand corner of FIG. 6. In particular, whilst the flow is as expected for processes A and B 210, 215, and execution proceeds to process C 220 resulting in the branch over path 222 to process D 225, process D may be able to avoid returning execution to the expected location within the trusted entity 200, due to having access to the return address for process B stored in the location 250 towards the bottom of the stack 230. In particular, if that return address information is copied into the capability link register used by process D, then process D can return over path 260 to process A, hence violating CFI.

FIG. 6 merely illustrates one very specific example of how the ability to copy a capability can result in CFI violations, and it will be appreciated that there are many other example scenarios where the creation of a copy of a particular capability can allow a non-trusted entity to alter the control flow.

In one embodiment, as will be discussed in more detail below, the new copy permission attribute such as the copyable attribute shown in FIG. 4 is used to inhibit such activities, by preventing in certain circumstances the generation of a copy of a capability.

Figure 7:
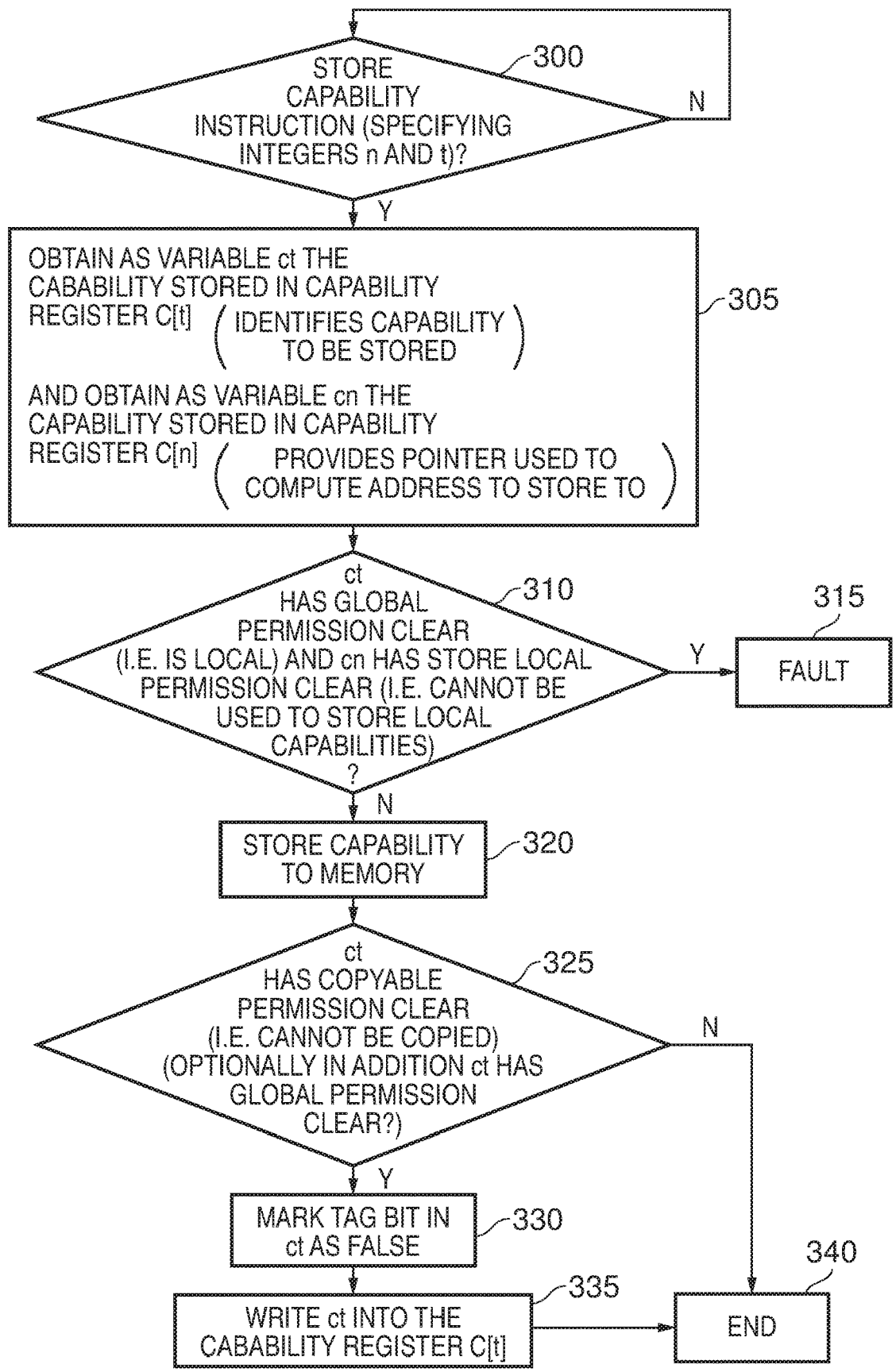
FIG. 7 is a flow diagram illustrating execution of a store capability instruction in accordance with one embodiment.

FIG. 7 illustrates how such an approach may be adopted in association with a store capability instruction, a store capability instruction being an instruction that specifies a capability to be stored from a capability register to memory. In particular, it will be assumed in this example that the store capability instructions specifies integers n and t that are used to identify two capability registers, as will be discussed in more detail with reference to box 305 in FIG. 7.

In particular, once it is determined at step 300 that the current instruction is a store capability instruction, at step 305 a variable ct is populated with the contents of the capability stored in the capability register C[t], i.e. the capability register identified by the integer t. It is the contents of this capability that are to be stored to memory. Further, a variable cn is populated with the capability stored in the capability register C[n], that capability providing the pointer used to compute the address in memory to be stored to.

Step 310 then shows a standard check that can be performed in one embodiment, but which is optional and hence could be omitted in another embodiment. In particular, it is checked whether ct has the global permission clear (i.e. is identified as a local capability) and whether cn has the store local permission clear (i.e. cannot be used to store local capabilities). If both of these conditions are true, then the process proceeds to step 315 where a fault is generated. In particular, under those conditions, the memory address derived from the pointer in cn cannot be used to store ct, since ct is identified as a local capability.

However, assuming both of the conditions identified in step 310 are not met, and hence the store can proceed, the process proceeds to step 320 (or proceeds directly from step 305 to step 320 if the optional step 310 is not performed, as for example may be the case if the "store local" permission is not used).

At step 320, the capability identified by the variable ct is stored to memory using the pointer contained within the variable cn to identify the memory address to store to.

At step 325, it is then determined whether the variable ct has the copyable permission clear, i.e. identifying that ct cannot be copied. In one embodiment, this is the only check performed at step 325, and if the copyable permission is not clear the process merely ends at step 340. However, if the copyable permission is clear, then the tag bit forming part of the variable ct is updated to mark that tag bit as false, i.e. the tag bit is cleared. Then, at step 335, the variable ct as updated by the step 330 is written back into the capability register C[t]. Due to the tag bit in the variable ct having been cleared, it will be appreciated that this then means that the source capability register C[t] is effectively invalidated, since by clearing the tag bit this indicates that the contents cannot be used as a capability. Hence, at this point the only valid copy of the capability is the one that has been stored out to memory. The process then ends at step 340.

In one embodiment, when assessing the status of the copyable permission at step 325, the global permission is also evaluated in order to determine whether the capability is marked as having global scope, or whether instead it is a local capability.

In one embodiment, only if ct has the copyable permission clear, and indicates a capability that is a local capability, will the process proceed to step 330, and in all other instances the no path to step 340 will be followed. Hence, the selective invalidation of the source capability in situations where the copyable permission indicates that copying is prohibited is restricted to situations where the capability is marked as a local capability. In practice, it has been found that whilst there are certain legitimate reasons for global capabilities to be copied, it is much less likely that there will be a legitimate reason to copy a local capability, and indeed certain local capabilities such as those used to identify a target address, such as a return address, should not typically need to be copied. Hence, any such attempt to copy such a capability may be indicative of an attempt to subvert CFI.

Furthermore, as will for example be discussed later with reference to FIG. 8 in respect of a load capability instruction, if the functionality is applied not only to local capabilities but also to global capabilities, then certain atomicity issues may arise, where a sequence of the update operations needs to be performed atomically in order to ensure correct operation. Atomicity is not a problem in the example of FIG. 7, since the read-modify-write functionality performed in respect of the source capability (as embodied by steps 305, 330, and 335) is performed in respect of a capability register being used by the current program thread.

Figure 8:
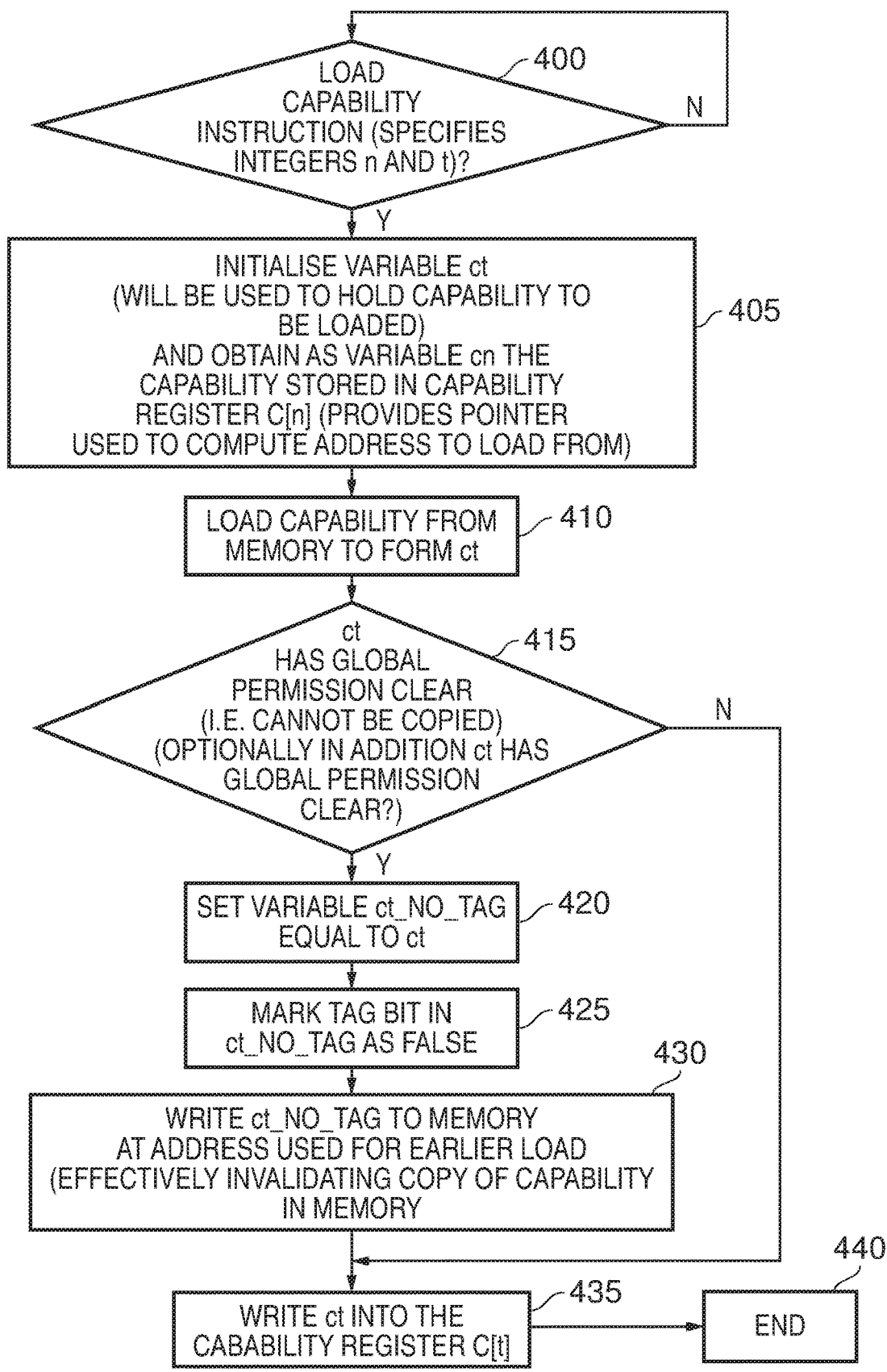
FIG. 8 is a flow diagram illustrating execution of a load capability instruction in accordance with one embodiment.

FIG. 8 is a flow diagram illustrating how a load capability instruction is handled in accordance with one embodiment. At step 400, it is determined whether a current instruction is a load capability instruction, and if so the processing proceeds to step 405. As with the store capability instruction discussed in FIG. 7, it is assumed that the load capability instruction specifies integers n and t. At step 405, the variable ct is initialised, for example by being set to a zero value. This variable will be used in due course to hold the capability that is to be loaded into a capability register. Further, the variable cn is populated with the capability contents stored in the capability register C[n], with the pointer stored in that capability being used to compute the address to load from.

At step 410, the capability is then loaded from the computed address in memory, and used to update the variable ct, so that the variable ct then contains the loaded capability.

At step 415, it is determined whether ct has the copyable permission clear, indicating that it cannot be copied. As with step 325 of FIG. 7, it may optionally in addition be assessed whether ct has the global permission clear, so that in the event that the copyable permission is clear the yes path is only followed if in addition the global permission is clear.

Assuming the yes path is followed, then at step 420 a further variable "ct_NO_TAG" is set equal to ct, to create another copy of the variable ct. Then, at step 425 the tag bit in the variable ct_NO_TAG is marked as false, whereafter at step 430 the variable ct_NO_TAG is written to memory at the address used for the earlier load at step 410. This effectively invalidates the copy of the capability held in memory, by marking it as no longer being a capability.

At step 435, the variable ct is written into the capability register C[t], whereafter the process ends at step 440. In the event that the no path is followed from set 415, steps 420 to 430 are bypassed, and the process proceeds directly to step 435.

It will be appreciated that whilst steps 420, 425, 430 provide one mechanism for updating the capability in memory in order to clear the tag field, in alternative embodiments different mechanisms can be used. For example, certain embodiments may provide a more direct mechanism for clearing the tag field in memory, without the need to generate a separate variable ct_NO_TAG which is then written back to memory.

If step 415 is limited so that the yes path is only followed if both the copyable permission is clear and the global permission is clear, thereby identifying that the capability is a local capability, there will be no atomicity issues associated with the read-modify-write operation implemented by steps 410, 420, 425 and 430. However, if the yes path from step 415 is followed whenever the copyable permission is clear, and irrespective of whether the capability is local or global, then additional steps may be required to ensure that the read-modify-write operation occurs atomically, so as to ensure correct operation in respect of any other threads that may share that capability. It will be appreciated that there are a number of known mechanisms for handling operations atomically, and any of those approaches could be used in order to ensure the atomicity of the read-modify-write operation performed in respect of the capability stored in memory.

FIG. 7 illustrates an example where the source bounded pointer storage element is a register, and the destination bounded pointer storage element is a memory location, whilst FIG. 8 illustrates a scenario where the source bounded pointer storage element is a memory location and the destination bounded pointer storage element is a capability register. Further, in both cases a direct copy is made where there is no mutation of the capability as it is subjected to the store operation or the load operation.

Figure 9:
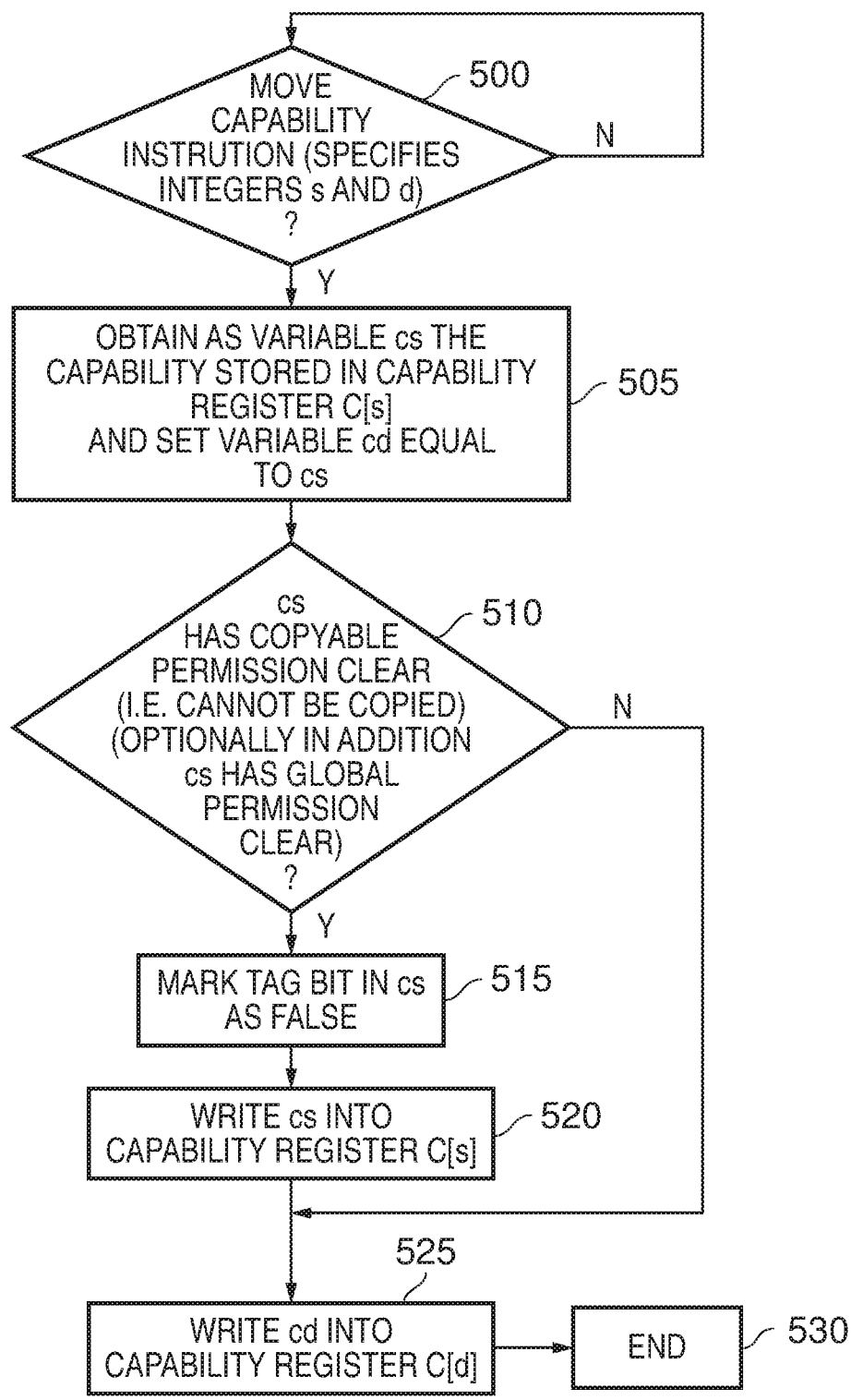
FIG. 9 is a flow diagram illustrating execution of a move capability instruction in accordance with one embodiment.

FIG. 9 illustrates an example where both the source bounded pointer storage element and the destination bounded pointer storage element are capability registers. In particular, FIG. 9 illustrates how a move capability instruction is handled in accordance with one embodiment. Although the instruction is called a move instruction, the default operation of the move instruction will result in the contents of the source register being transferred to a destination register, but with no active steps taken to remove the contents of the source register. Hence, this is another example of an instruction implementing a copy operation, where the above described techniques can be used to ensure that under certain situations it can be guaranteed that only one copy will remain after the instruction is executed.

At step 500, it is determined whether the current instruction is a move capability instruction, and if so the process proceeds to step 505. It is assumed in this example that the move capability instruction specifies integers s and d, being indicative of source and destination, respectively. At step 505, the variable cs is populated with the capability stored in the capability register C[s]. In addition, the variable cd is set equal to cs.

At step 510, it determined whether cs has the copyable permission clear. Optionally, as discussed earlier in respect of step 325 of FIG. 7 and step 415 of FIG. 8, it can also be determined whether cs has the global permission clear, indicating that the capability is a local capability. If the conditions specified at step 510 are met, the process proceeds to step 515 where the tag bit in cs is marked as false, whereafter at step 520 the variable cs is written into the capability register C[s]. This causes the source capability to be invalidated, by marking the source capability register's contents as no longer relating to a capability. At step 525, the variable cd is written into the capability register C[d], whereafter the process ends at step 530. If the no path is followed from step 510, then steps 515 and 520 are bypassed, and the process proceeds directly to step 525.

When processing such a move instruction, the read-modify-write operation performed in respect of the source capability (as embodied by steps 505, 515, 520) is atomically safe, since it is performed in respect of a capability register whose use is controlled by the current program thread. Hence, there are no atomicity issues even if step 510 does not include the optional step of limiting the invalidation of the source capability to situations where the source capability is marked as a local capability.

The general process illustrated in FIG. 9 is also applicable to any other type of capability instruction that operates on source and destination capability registers, and specifies a form of copy operation, whether that copy operation be a true creation of a replica, or whether it includes some mutation where the capability stored in the destination capability register is a modified version of the capability stored in the source capability register. Since the contents of the destination capability register are directly derived from the contents of the source capability register, this is viewed as representing a copy, and accordingly the process of FIG. 9 can be used to selectively invalidate the source capability register. With regards to step 505, it will appreciated that if the instruction performs some mutation with respect to the source capability, then the variable cd will not be set equal to cs, but instead some mutation operation will be performed on the variable cs with the result then being stored as the variable cd.

For completeness, the processes discussed with reference to FIGS. 7, 8 and 9 can also be represented in pseudo-code, for example as follows:

```
// Store capability instruction
StoreCapability(integer n, integer t)
    Capability ct = C[t];
    Capability cn = C[n];
    if (ct.local && !cn.store_local)
        fault
    // store capability to memory
    MemC(cn, ct);
    // conditionally clear the register tag
    if (ct.local && ct.no_copy)
        ct.tag = FALSE;
        C[t] = ct
// Load capability instruction
LoadCapability(integer n, integer t)
    Capability ct;
    Capability cn = C[n]
    // load capability from memory
    ct = MemC(cn);
    // conditionally clear the memory tag
    if (ct.local && ct.no_copy)
        Capability ct_no_tag = ct;
        ct_no_tag.tag = FALSE;
        MemC(cn, ct_no_tag); // performed atomically with respect to
                                the first MemC operation
    C[t] = ct
// Move a capability between registers
MoveCapability(integer d, integer s)
    Capability cs = C[s];
    Capability cd = cs;
    // conditionally clear the source register tag
    if (cs.local && cs.no_copy)
        cs.tag = FALSE;
        C[s] = cs;
    C[d] = cd;
```

In the above example pseudo-code, it is assumed that the global permission is actually a "local" permission which is set to indicate that the capability is a local capability and is cleared to indicate that the capability is a global capability. Further, the copyable permission attribute is actually in this instance a "no_copy" permission attribute which is set to identify that copying is prohibited and is cleared to indicate that copying is allowed.

It will be appreciated that the above example pseudo code only provides one specific example, and that the above described processes could be represented by alternative pseudo code if desired. For example, in embodiments where the "store local" permission is not used/supported, the pseudo code could be modified accordingly. As another example, the "no_copy" permission could be replaced with a "copyable" permission and the pseudo code changed accordingly.

In one embodiment the above described functionality can be applied in respect of a standard capability instruction that specifies a copy operation, such a capability instruction being arranged to operate on capabilities such as those stored in the capability registers 60, rather than on general purpose data such as stored in the registers 40. However, in an alternative embodiment "no_copy" versions of such capability instructions can be introduced, with the earlier described processing being the processing that is performed when the no_copy variant of the capability instruction is executed. Whilst this will lead to an increase in the number of different instructions, it can give rise to some performance benefits, since the above described mechanisms only need to be performed when the no_copy variants of the instructions are executed, and the processing can be somewhat simplified when the standard capability instructions are executed.

Figure 10:
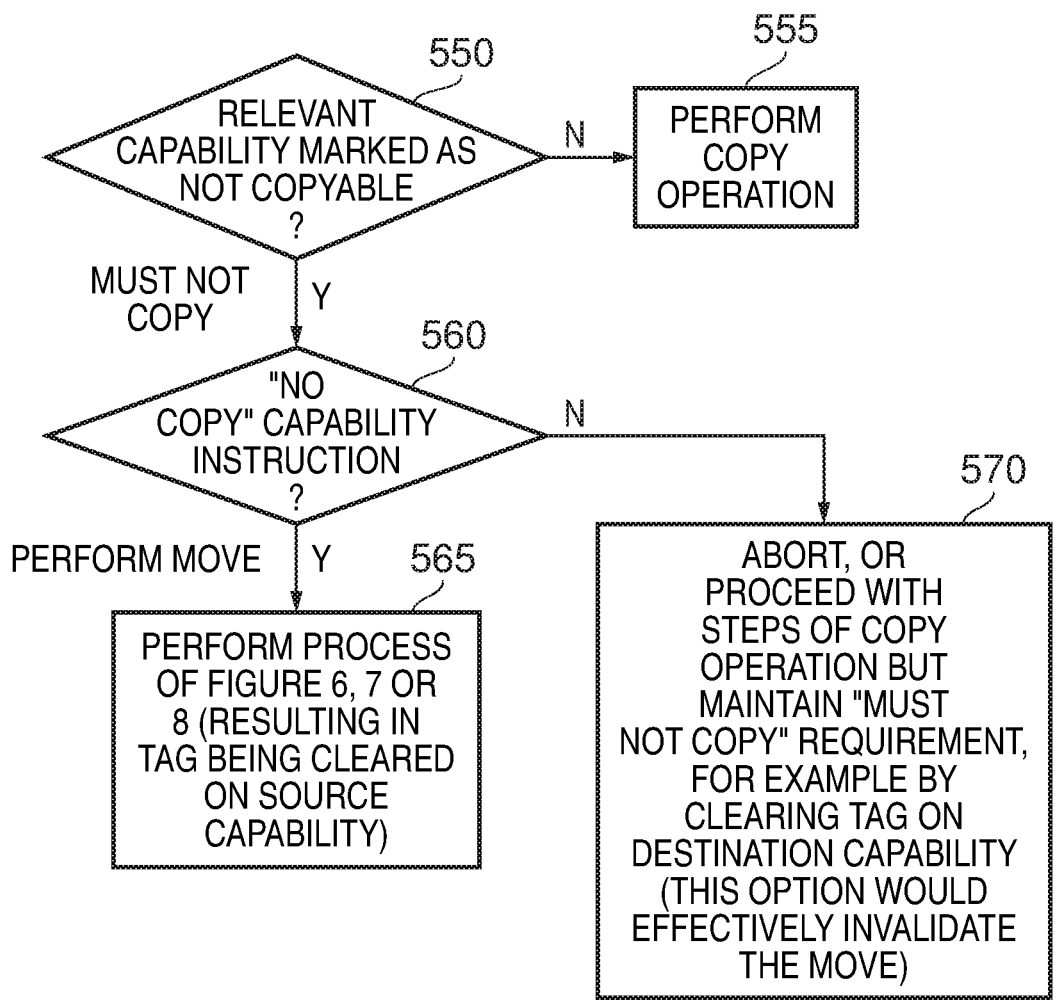
FIG. 10 is a flow diagram illustrating how a "no copy" variant of a capability instruction may be utilised in accordance with one embodiment.

FIG. 10 illustrates in general overview how the two variants of a capability instruction could be used. At step 550, it is determined whether the relevant capability is marked as not copyable. If it is not, then a copy operation can be performed as normal at step 555 irrespective of whether the capability instruction specifying the copy operation is the normal capability instruction or the no_copy variant.

However, if the relevant capability is marked as not copyable (optionally as additionally qualified by whether the capability is marked as a local capability), then the yes path from step 550 is followed, and subsequent processing must ensure that a copy is not created. If at step 560 it is determined that the no_copy variant of the capability instruction is being executed, then the process proceeds to step 565 where the earlier described processes of FIG. 6, 7 or 8 are performed, resulting in the tag being cleared on the source capability. Hence, by performing these processes, the copy operation is effectively modified so as to perform a true move, with the source capability not being retained in a valid form.

If the capability instruction executed at step 560 is not the no_copy variant, then the no path is followed to step 570. The exact steps taken at step 570 can be varied dependent on implementation, provided they maintain the "must not copy" requirement resulting from the yes path being followed from step 550. For example, in one embodiment, an abort could be raised under this instance, since it may be assumed that it is incorrect to use a standard capability instruction to perform a copy operation in respect of a capability that is marked as not copyable. In an alternative embodiment, the process may proceed with the standard steps of the copy operation but take additional measures to maintain the must not copy requirement. This could for example be achieved by clearing the tag field on the destination capability, which would effectively invalidate the copy, and restore the situation to the situation that existed prior to the copy operation being performed. This can provide a particularly elegant solution when dealing with load operations, as it avoids the need for atomicity steps being required in respect of memory in embodiments where the functionality is not limited to situations where the capability is a local capability. In particular, since the copy that has been loaded into the register is invalidated, no steps are required in connection with the copy held in memory.

Figure 11:
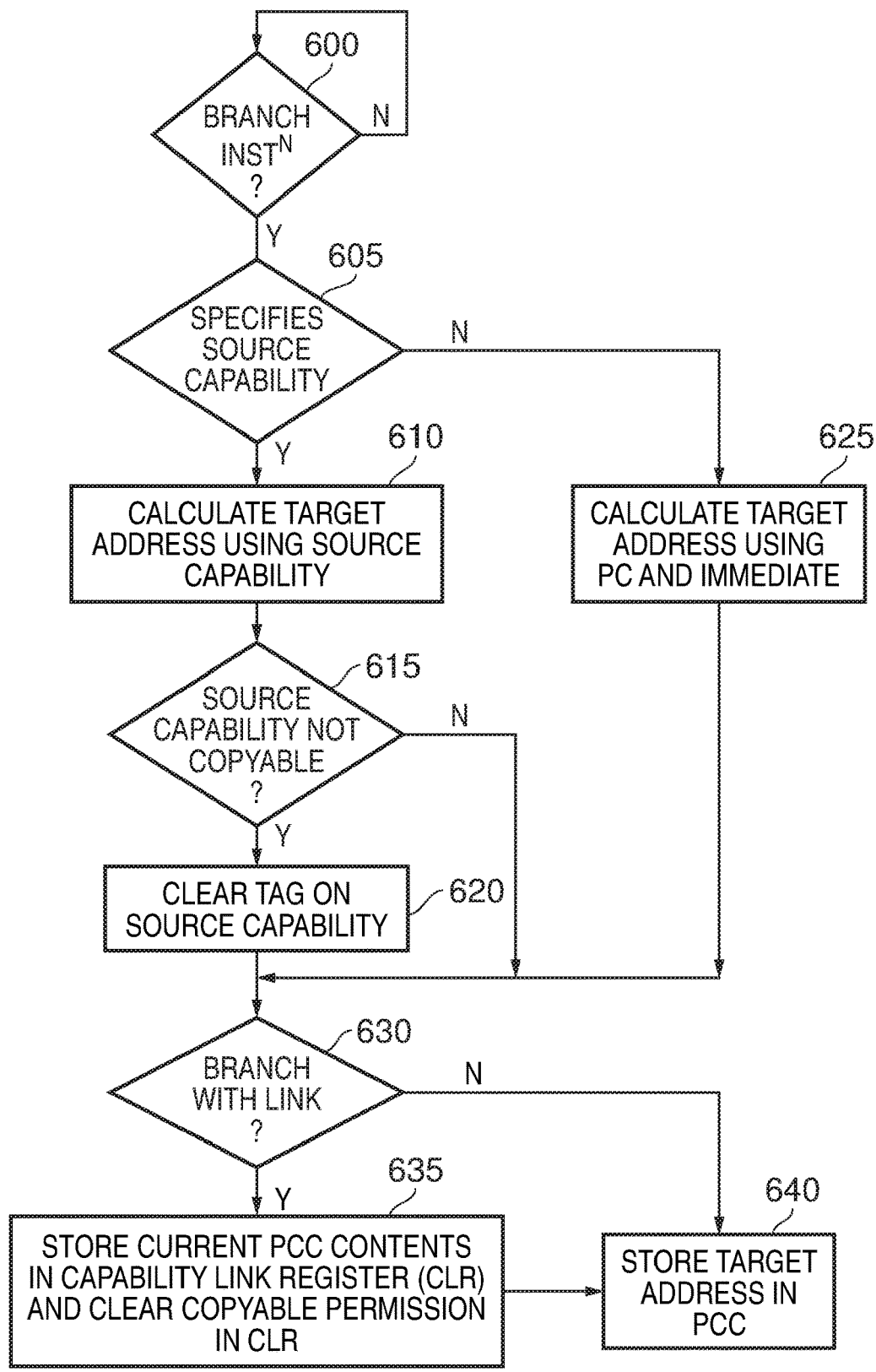
FIG. 11 is a flow diagram illustrating how branch instructions may be handled in accordance with one embodiment.

FIG. 11 is a flow diagram illustrating how branch instructions can be handled in accordance with one embodiment, branch instructions also being a type of instruction that effectively perform a copy operation due to the update performed with regards to the program counter. At step 600, it is determined whether a branch instruction has been received, and if so it is determined at step 605 whether that branch instruction species a source capability. If the branch instruction specifies a source capability (whose pointer will hence be used to derive the target address), then the yes path will be followed from step 605. If not, then the branch instruction is an immediate branch where the target address is calculated with reference to an offset specified directly in the branch instruction, and accordingly the no path is followed from step 605.

Assuming the yes path is followed, then at step 610 the target address is calculated using the pointer held in the source capability, whereafter it is determined at step 615 whether the source capability is marked as not being copyable. Again, as discussed earlier, this decision can also be restricted to situations where the source capability is marked as a local capability. For example, it may be desired to reserve some function pointers/return addresses for use by the local thread (local and in at least some instances not copyable), and have others shared (global and copyable) with other threads.

Assuming the yes path is followed from step 615, then the tag is cleared on the source capability at step 620, whereas otherwise step 620 is bypassed. By clearing the tag on the source capability at step 620, this ensure that there will only be one copy of the source capability once the program counter capability register has been updated using the target address information calculated from the source capability.

If the no path is followed from step 605, then the target address is calculated using the current program counter and the immediate value specified in the branch instruction, as shown by step 625.

At step 630, it is determined whether the branch instruction is a branch with link instruction. If not, then the target address can merely be stored in the program counter capability register at step 640 and no further steps are required. However, if the branch instruction is a branch with link instruction, then the current PCC contents will be used to specify a return address, and in particular at step 635 the current PCC contents will be stored in the Capability Link Register (CLR). The contents of the Capability Link Register then specify a return address that is used in due course to return to the original execution flow following performance of the process branched to. In one embodiment, as indicated at step 635, the copyable permission is cleared in the CLR at this point, thereby ensuring that the return address information cannot be copied.

Following step 635, the process proceeds to step 640 where the target address is stored in the PCC.

From the above described embodiments, it will be appreciated that the use of the additional copy permission attribute to mark certain capabilities as non-copyable allows the behaviour of copy operations to be modified, either in all instances, or in one embodiment limited to situations where the capabilities are marked as local capabilities. In particular, under those circumstances, a copy operation can be effectively converted into a true move operation, where it can be ensured that following performance of the copy operation only one copy of the capability still exists. This can significantly improve robustness to attempts to violate CFI.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus, comprising:
a plurality of bounded pointer storage elements, each bounded pointer storage element to store a bounded pointer and associated permission attributes indicative of allowed uses of the bounded pointer, said associated permission attributes comprising a copy permission attribute indicating whether the bounded pointer is allowed to be subjected to a copy operation; and
processing circuitry, responsive to at least one instruction that specifies the copy operation, to generate, from a source bounded pointer and associated permission attributes of a source bounded pointer storage element, a destination bounded pointer and associated permission attributes to be stored in a destination bounded pointer storage element, and to mark the source bounded pointer storage element as storing an invalid bounded pointer dependent on whether the copy permission attribute of the source bounded pointer has a first value indicating that the source bounded pointer is to be prevented from being subjected to the copy operation, whereas when the copy permission attribute has a second value indicating that the source bounded pointer is allowed to be subjected to the copy operation, the processing circuitry is arranged to retain the source bounded pointer storage element as storing a valid bounded pointer; wherein
each bounded pointer storage element has a validity field associated therewith to indicate whether the bounded pointer storage element stores a valid bounded pointer, and the processing circuitry is arranged to mark the source bounded pointer storage element as storing an invalid bounded pointer by updating the validity field associated with the source bounded pointer storage element to identify that the source bounded pointer is invalid.

2. An apparatus as claimed in claim 1, wherein the validity field is a tag field identifying a data type of content of the associated bounded pointer storage element, when the tag field has a first value the content forming a bounded pointer and associated permission attributes, and when the tag value has a value other than said first value the content being treated as data other than a bounded pointer and associated permission attributes.

3. An apparatus as claimed in claim 1, wherein the processing circuitry is arranged, when executing said at least one instruction that specifies the copy operation, to mark the source bounded pointer storage element as storing an invalid bounded pointer when the copy permission attribute of the source bounded pointer has the first value indicating that the source bounded pointer is to be prevented from being subjected to the copy operation.

4. An apparatus as claimed in claim 1, wherein:
said associated permission attributes comprise a sharing attribute indicating whether the bounded pointer is shared between multiple threads; and
the processing circuitry is arranged, when executing said at least one instruction that specifies the copy operation, to mark the source bounded pointer storage element as storing an invalid bounded pointer when the copy permission attribute of the source bounded pointer has the first value indicating that the source bounded pointer is to be prevented from being subjected to the copy operation and the sharing attribute indicates that the bounded pointer is not shared between multiple threads.

5. An apparatus as claimed in claim 1, wherein:
the source bounded pointer comprises a pointer value and associated range information, and during the copy operation a modification of the pointer value is prohibited.

6. An apparatus as claimed in claim 5, wherein the source bounded pointer is used to determine a function pointer.

7. An apparatus as claimed in claim 1, wherein the copy operation causes the destination bounded pointer and associated permission attributes to be a replica of the source bounded pointer and associated permission attributes.

8. An apparatus as claimed in claim 1, wherein the copy operation causes at least one of the destination bounded pointer and associated permission attributes to be a modified version of the source bounded pointer and associated permission attributes.

9. An apparatus as claimed in claim 8, wherein during the copy operation extension of the bounds of the bounded pointer is prohibited.

10. An apparatus as claimed in claim 8, wherein during the copy operation modification of the associated permission attributes to increase the allowed uses of the bounded pointer is prohibited.

11. An apparatus as claimed in claim 1, wherein at least one of the source bounded pointer storage element and the destination bounded pointer storage element is a bounded pointer register.

12. An apparatus as claimed in claim 1, wherein at least one of the source bounded pointer storage element and the destination bounded pointer storage element is a memory location.

13. An apparatus as claimed in claim 1, wherein said at least one instruction comprises a first instruction that is a "no copy" variant of a second instruction, and the processing circuitry is responsive to execution of said second instruction in an instance where the copy permission attribute of the source bounded pointer indicates that the source bounded pointer is to be prevented from being subjected to the copy operation, to implement a predetermined action to prevent a copy of the source bounded pointer being created.

14. An apparatus as claimed in claim 13, wherein said predetermined action comprises aborting execution of the second instruction.

15. An apparatus as claimed in claim 13, wherein said predetermined action comprises marking the destination bounded pointer storage element as storing an invalid bounded pointer.

16. An apparatus as claimed in claim 1, wherein:
said at least one instruction comprises a branch instruction, and the source bounded pointer is used to generate a target address for storage as a new program counter value within a program counter bounded pointer storage element.

17. An apparatus as claimed in claim 16, wherein said branch instruction is a branch with link instruction, during execution of the branch with link instruction the processing circuitry being arranged to store a current content of the program counter bounded pointer storage element within a link register bounded pointer storage element to identify a return address bounded pointer, and to set the copy permission attribute within the link register bounded pointer storage element to indicate that the return address bounded pointer is to be prevented from being subjected to the copy operation.

18. An apparatus as claimed in claim 1, wherein each bounded pointer storage element comprises a first sub-element to store the bounded pointer and a second sub-element to store the associated permission attributes.

19. A method of controlling use of bounded pointers within an apparatus having a plurality of bounded pointer storage elements, each bounded pointer storage element storing a bounded pointer and associated permission attributes indicative of allowed uses of the bounded pointer, the method comprising:

providing a copy permission attribute within said associated permission attributes, the copy permission attribute indicating whether the bounded pointer is allowed to be subjected to a copy operation; and responsive to at least one instruction that specifies the copy operation, generating, from a source bounded pointer and associated permission attributes of a source bounded pointer storage element, a destination bounded pointer and associated permission attributes to be stored in a destination bounded pointer storage element, and marking the source bounded pointer storage element as storing an invalid bounded pointer dependent on whether the copy permission attribute of the source bounded pointer has a first value indicating that the source bounded pointer is to be prevented from being subjected to the copy operation, whereas when the copy permission attribute has a second value indicating that the source bounded pointer is allowed to be subjected to the copy operation, retaining the source bounded pointer storage element as storing a valid bounded pointer;

providing each bounded pointer storage element with a validity field associated therewith to indicate whether the bounded pointer storage element stores a valid bounded pointer; and marking the source bounded pointer storage element as storing an invalid bounded pointer by updating the validity field associated with the source bounded pointer storage element to identify that the source bounded pointer is invalid.

20. An apparatus, comprising:

a plurality of bounded pointer storage element means, each bounded pointer storage element means for storing a bounded pointer and associated permission attributes indicative of allowed uses of the bounded pointer, said associated permission attributes comprising a copy permission attribute indicating whether the bounded pointer is allowed to be subjected to a copy operation; and processing means for generating from a source bounded pointer and associated permission attributes of a source bounded pointer storage element means, in response to at least one instruction that specifies the copy operation, a destination bounded pointer and associated permission attributes to be stored in a destination bounded pointer storage element means, and for marking the source bounded pointer storage element means as storing an invalid bounded pointer dependent on whether the copy permission attribute of the source bounded pointer has a first value indicating that the source bounded pointer is to be prevented from being subjected to the copy operation, whereas when the copy permission attribute has a second value indicating that the source bounded pointer is allowed to be subjected to the copy operation, the processing means is arranged to retain the source bounded pointer storage element means as storing a valid bounded pointer; wherein each bounded pointer storage element means has a validity field associated therewith to indicate whether the bounded pointer storage element means stores a valid bounded pointer, and the processing means is arranged to mark the source bounded pointer storage element means as storing an invalid bounded pointer by updating the validity field associated with the source bounded pointer storage element means to identify that the source bounded pointer is invalid.

* * * * *